June 24, 1941. J. Q. SHERMAN ET AL Re. 21,842
PLATEN ROLL FOR WRITING MACHINES
Original Filed Aug. 29, 1933 4 Sheets-Sheet 1
Fig. 1
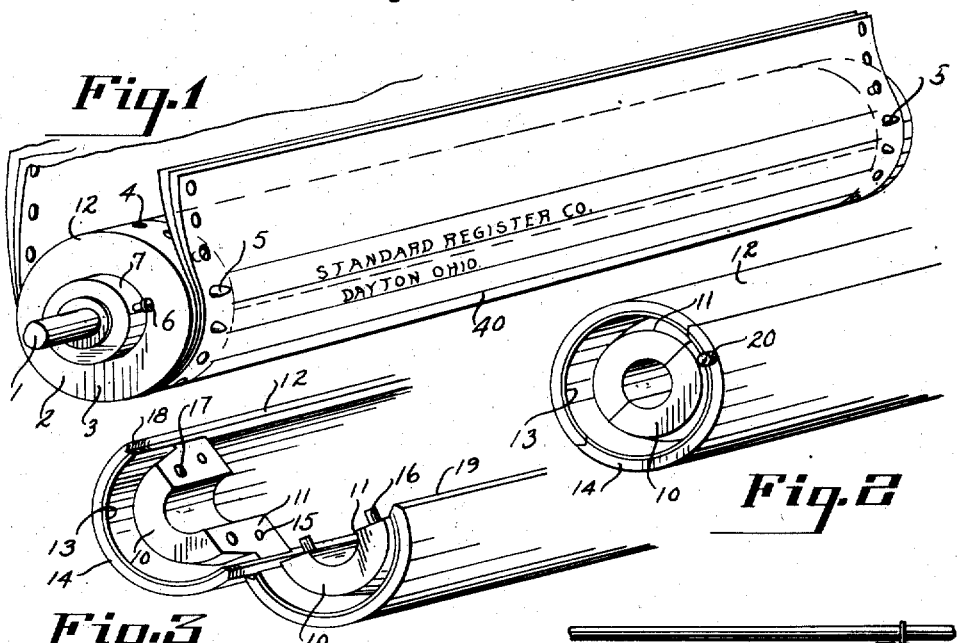
Fig. 2
Fig. 3
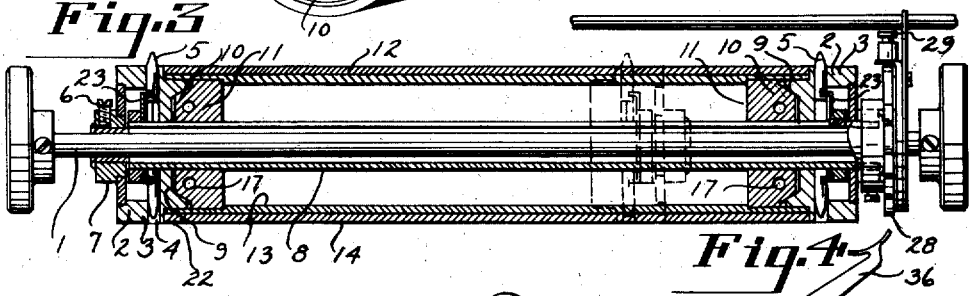
Fig. 4
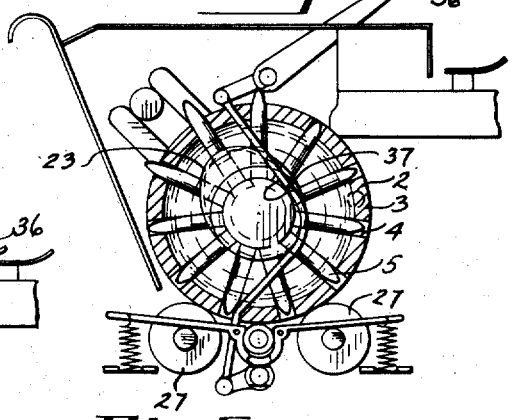
Fig. 5
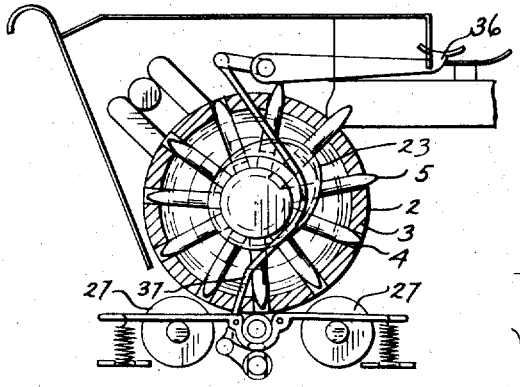
Fig. 6
INVENTORS
John Q. Sherman
BY and Albert W. Wagner
Walker and Dybvig ATTORNEYS June 24, 1941. J. Q. SHERMAN ET AL Re. 21,842

PLATEN ROLL FOR WRITING MACHINES

Original Filed Aug. 29, 1933 4 Sheets-Sheet 2

INVENTORS
John Q. Sherman
BY Albert F. J. Hetzner
Walker and Berry
ATTORNEYS

June 24, 1941. J. Q. SHERMAN ET AL Re. 21,842

PLATEN ROLL FOR WRITING MACHINES

Original Filed Aug. 29, 1933 4 Sheets-Sheet 3

INVENTORS
John Q. Sherman
BY Albert H. Kirchner
Walker and Sibley
ATTORNEYS

June 24, 1941. J. Q. SHERMAN ET AL Re. 21,842

PLATEN ROLL FOR WRITING MACHINES

Original Filed Aug. 29, 1933 4 Sheets-Sheet 4

John Q. Sherman
and Albert W. Kenyon
INVENTORS
BY
Walker and Dybvig
ATTORNEYS

Reissued June 24, 1941

Re. 21,842

UNITED STATES PATENT OFFICE 21,842

PLATEN ROLL FOR WRITING MACHINES

John Q. Sherman and Albert W. Metzner, Dayton Ohio; said Metzner assignor to said Sherman; Katherine M. Sherman, William C. Sherman, and Wellmore B. Turner executors of estate of said John Q. Sherman, deceased Original No. 2,067,211, dated January 12, 1937, Serial No. 687,303, August 29, 1933. Application for reissue January 9, 1939, Serial No. 249,980

40 Claims. (Cl. 197—133)

Figure 12:
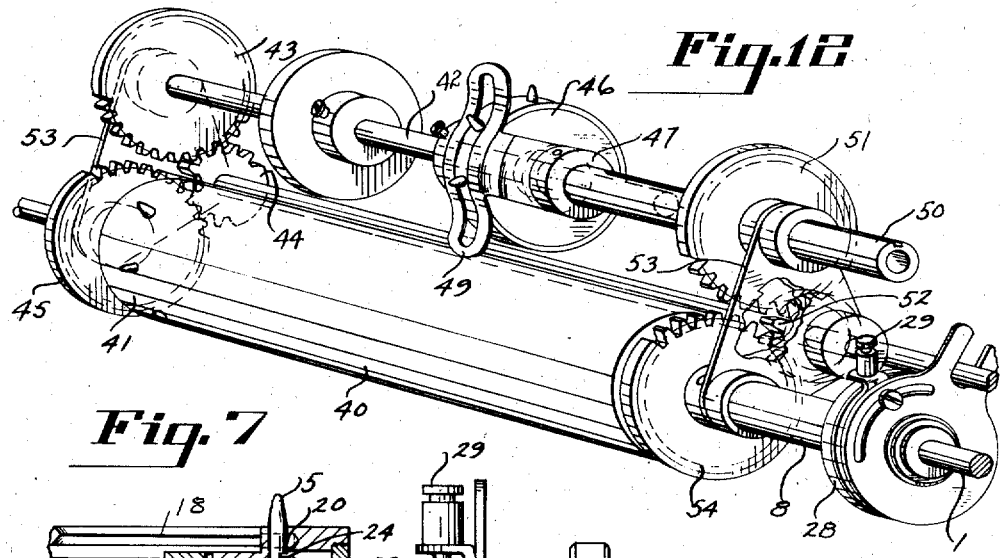

This invention relates to writing machines, and more particularly to paper feeding means for positively feeding superposed strips of manifolding material of different widths while maintaining corresponding portions of the several strips in accurate alignment and registry with each other.

The present embodiment of the invention includes a platen roll which is interchangeable with the usual frictional feed type of platen roll, ordinarily found in writing and computing machines, with which are associated pin wheel units, the feeding pins of which are engageable in series punched holes in the record material and which are axially adjustable toward and from each other to agree with material of different widths, the pin wheel units being rotatable in unison in all positions of axial adjustment. Intermediate the pin wheel units are interchangeably interposed platen roll sections, preferably longitudinally split, of different lengths to agree with the relative spacing of the pin wheel units and which may be of different degrees of hardness or of other varying surface characteristics, and which are locked in position by the adjustment of the pin wheel units. The feeding pins of the several units are retractably mounted for progressive projection into and withdrawal from engagement with series punched holes in the writing material in unison with the rotation of the platen roll, and further are caused to be projected at effective and ineffective positions at will, whereby the material may be fed either positively by such pin wheel units or frictionally by the usual pressure rollers cooperating with the platen roll.

As a variation of the adaptability to paper of different widths a solid platen roll may be employed with which is associated one pin wheel unit while a second pin wheel unit is axially adjustable in parallel offset relation with the platen roll, the platen roll and offset pin wheel unit being interconnected for unison rotation.

The object of the invention is to simplify the construction as well as the means and mode of operation of positive feeding devices for writing machines whereby they will not only be cheap in construction, but will be more efficient in use, automatic in action, uniform in operation, capable of a wide range of adjustment, and unlikely to get out of repair.

A further object of the invention is to provide a pin wheel type of feeding mechanism applicable to typewriters, computing and recording machines, which will be interchangeable with the usual frictional type platen roll with which such machines are originally equipped.

A further object of the invention is the provision of feeding mechanism readily adaptable for positively feeding record material of different widths.

A further object of the invention is the provision of interchangeable platen roll sections of varying lengths or of different surface character.

A further object of the invention is to provide easily or readily interchangeable platen roll sections and axially adjustable pin wheel units cooperating therewith.

A further object of the invention is to provide improved means for interlocking the platen roll sections and the pin wheel units in their adjusted positions.

A further object of the invention is to provide positive feeding means for different widths of writing material having the advantageous features and desirable characteristics hereinafter described.

With the above primary and other incidental objects in view, as will more fully appear in the specification, the invention consists of the features of construction, the parts and combinations thereof, and the mode of operation, or their equivalents, as hereinafter described and set forth in the claims.

Figure 7:
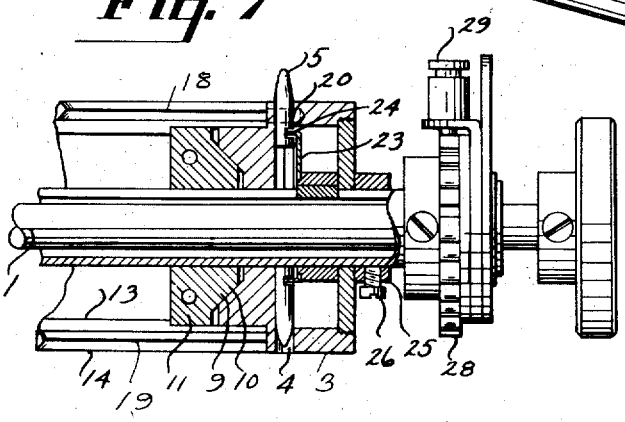
Figure 13:
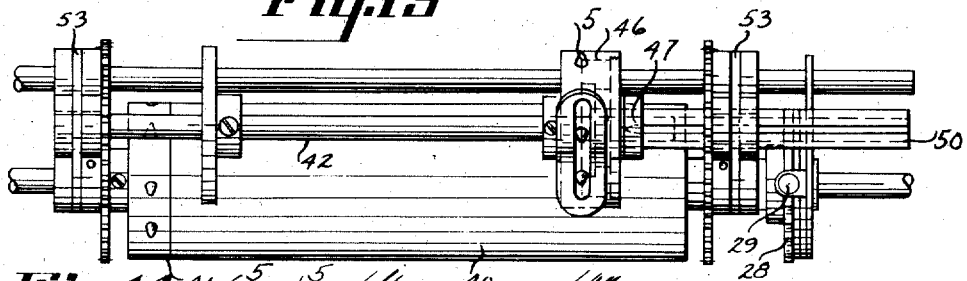
Figure 14:
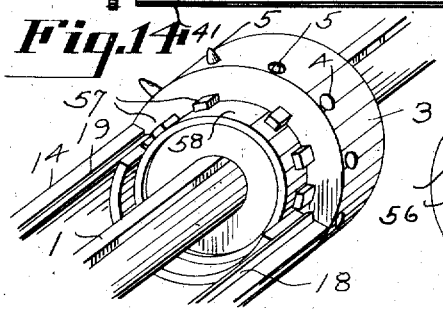
Figure 15:
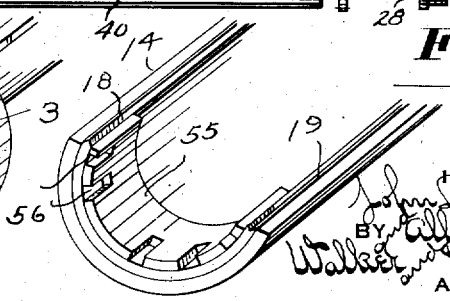
Figure 8:
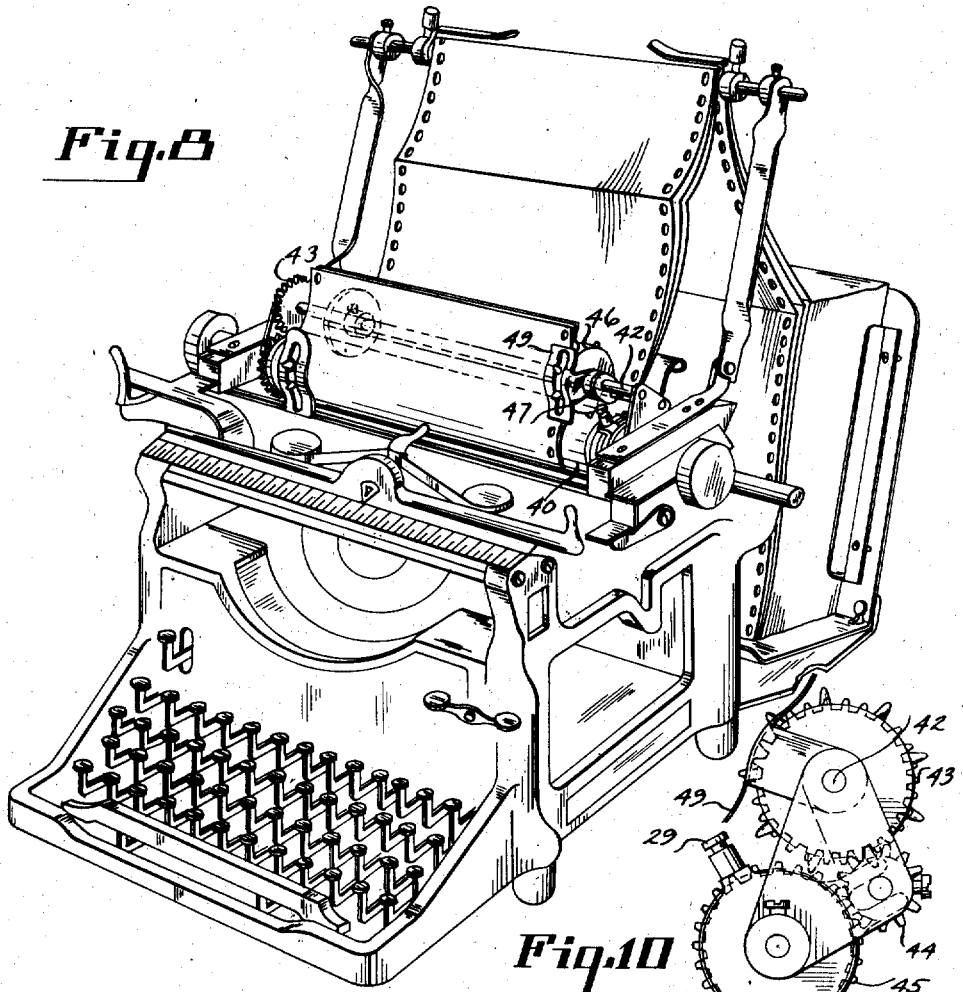
Figure 10:
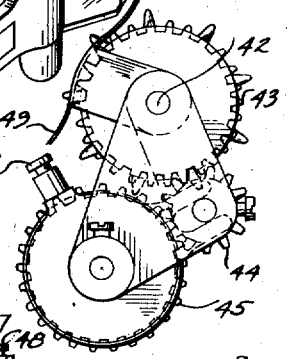
Figure 11:
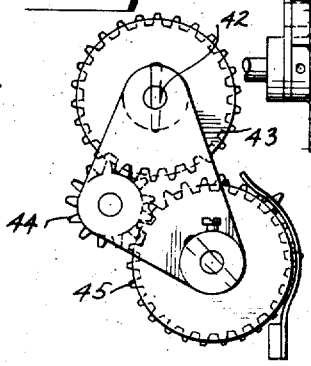
Figure 9:
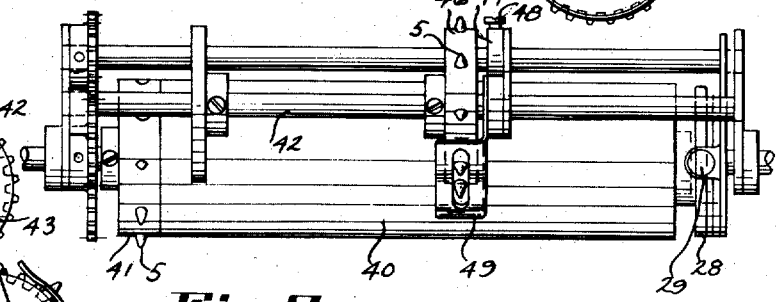
Figure 16:
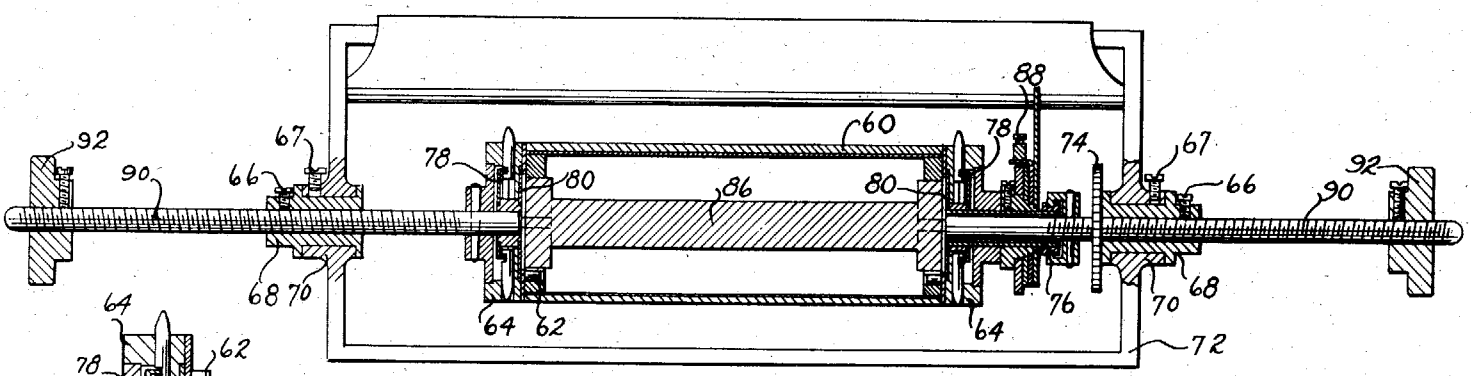
Figure 18:
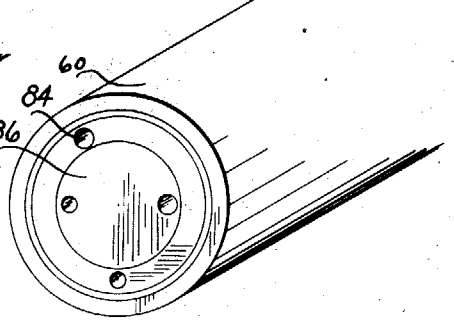
Figure 17:
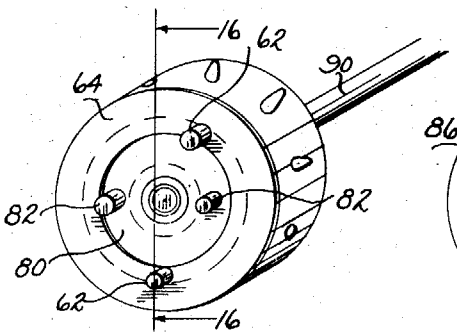
Figure 19:
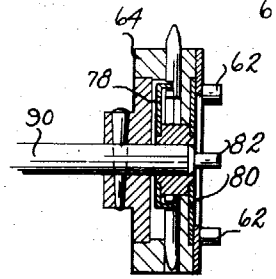

Referring to the accompanying drawings, wherein is shown the preferred but obviously not necessarily the only form of embodiment of the invention, Fig. 1 is a perspective view of a sectional platen roll, provided with adjustable pin type feeding units, forming the subject matter of the present invention. Fig. 2 is a detail perspective view of one end of the divided platen roll, illustrating the parts in their interconnected positions. Fig. 3 is a similar detail perspective view, showing the sections of the divided roll separated from each other. Fig. 4 is a longitudinal sectional view of the assembled platen roll with its pin type feeding units. Fig. 5 is an end elevation, showing the feeding pins in their effective or paper engaging positions. Fig. 6 is a similar view, showing the feeding pins adjusted to an ineffective position and the pressure rollers engaging with the platen for frictional feeding of the writing material. Fig. 7 is an enlarged detail sectional view. Fig. 8 is a perspective view of a conventional form of writing machine to which a modified construction of adjustable paper feeding mechanism has been applied. Fig. 9 is a top plan view of the adjustable paper feeding apparatus illustrated in Fig. 8. Figs. 10 and 11 are end elevations of opposite ends of the paper feeding mechanism illustrated in Figs. 8 and 9. Fig. 12 is an enlarged perspective view of a further modification. Fig. 13 is a top plan view of the apparatus illustrated in Fig. 12. Figs. 14 and 15 illustrate a modification of the locating and driving connection between the pin wheel units and the platen roll. Fig. 16 discloses a longitudinal sectional view of another modification. Figs. 17 and 18 disclose perspective views of the pin wheel and the platen respectively. Fig. 19 discloses an enlarged sectional view of the pin wheel feeding device.

Like parts are indicated by similar characters of reference throughout the several views.

Typewriters, recording and computing machines, and other writing machines are ordinarily equipped with platen rolls of the friction type, about which writing material is advanced by pressure rollers frictionally engaging the under side of the platen roll. However, in the manifolding of copies upon superposed sheets or strips of writing material much difficulty has been experienced in maintaining printed forms upon the superposed record strips in accurate alignment and registry with each other.

The present strip feeding mechanism provides means for positively feeding superposed record strips in accurate registry and alignment with each other and is interchangeable with the usual friction type platen roller ordinarily found in writing machines. It also cooperates with the usual pressure rollers for frictionally feeding writing material alternately with the positive feeding thereof by the pin wheel units.

In the preferred form of embodiment as illustrated in Figs. 1 to 7, the apparatus comprises a main shaft 1 to be journalled in the bearings of the platen carriage of the writing machine from which the usual platen roll has been removed. Mounted upon the shaft 1 is a pair of pin wheel units 2—2, each of which comprises a rotary head 3 having therein radial bores 4 in which are located reciprocatory taper pointed feeding pins 5. One of the pin wheel units 2 is fixedly secured upon the shaft 1 by means of the set screw 6 carried in a hub 7 pressed in the lateral face of the pin wheel unit and engaging a split sleeve or bushing 8 surrounding the shaft 1. The second pin wheel unit is axially adjustable toward and from the fixed unit upon a sleeve 8 concentrically surrounding the shaft 1, upon which the second pin wheel unit is both slidingly and revolubly mounted.

The adjacent faces of the pin wheel units 2 are conically recessed at 9 to receive the conical faces 10 of the hubs 11 of a platen roll section 12 interposed between the pin wheel units 2. A series of platen roll sections of different lengths are provided. Each section comprises a pair of transversely split hubs 11 secured within the ends of a split sleeve 13, usually of metal, about which is disposed a concentric split jacket or exterior sleeve 14 of rubber, fiber, or other material affording a suitable impact surface for the imprinting type. The respective halves of the hubs 11 are fixedly secured to the respective sections of the split tube or sleeve 13 by rivets 15 or by welding, brazing or other suitable method of attachment. Dowel pins 16 are provided in one half of each hub 11 for engagement in corresponding holes 17 in the opposite half of the hub to insure the accurate positioning of the hub and sleeve portions relative to each other.

The respective halves of the longitudinally split platen roll sections, comprising the split concentric sleeves 13 and 14, are provided with tongue and groove engaging margins 18 and 19 whereby the halves of the platen roll sections are accurately positioned flush with each other. Each section of the longitudinally split platen roll is provided with a terminal projecting stud 20 engageable in a corresponding hole in the lateral face of the contiguous pin wheel unit, as shown by dotted lines at 21 in Fig. 7.

The hubs 11 of the platen roll section are inset somewhat from the ends of the cylinder, which project beyond the heads 11 to overlapping engagement within a peripheral rabbet 22 formed in the adjacent pin wheel unit. At the same time, the conical face 10 of the hub 11 seats securely within the tapered seat 9 in the lateral face of the pin wheel unit. The platen roll cylinder is thus securely held between the respective pin wheel units 2, one of which, as before described, is axially adjustable relative to the other into clamping engagement with sectional platen roll cylinders of different lengths. In Fig. 4 one of the pin wheel units is shown by dotted lines adjusted to accommodate a sectional platen cylinder of lesser length. By providing a series of sectional platen cylinders of different lengths to be positioned between the respective units by their relative adjustment toward and from each other in accordance with the length of the sectional platen cylinder, writing material of different widths may be accommodated and likewise platen cylinders having different surface characteristics may be interchangeably substituted for each other. In some instances such interchangeable platen cylinders including the jackets and hubs are divided on lines of division longitudinally offset from the diametrical plane of the platen. In either event, that is, when the lines of division of the plane are coincident with or longitudinally offset from the common diametrical plane of the platen, the lines of division are so positioned relative to the degree of rotation of the platen by the usual line space mechanism of the writing machine that the writing line and the division lines of the platen will never coincide but will be above and below the division lines as the platen is rotated step by step through predetermined distances by the line spacing mechanism.

The inner concentric sleeve 8, surrounding the shaft 1 and upon which one of the pin wheel units is both slidingly and revolubly mounted, is capable of a limited rocking motion, although it is normally stationarily held in one position or the other of such rocking adjustment.

Carried upon the rock sleeve 8 are eccentric cams 23 of which there is one associated with each pin wheel unit 2. The cam 23, pertaining to the non-adjustable pin wheel unit at the left, is fixedly secured to the rock sleeve 8 while the eccentric cam 23, pertaining to the adjustable pin wheel unit shown at the right in the drawings, is splined upon the rock sleeve for unison rocking motion but capable of independent longitudinal sliding motion in unison with the axial adjustment of such pin wheel unit. The eccentric cams 23 are provided with lateral flanges 24 engaging within notches in the reciprocatory feeding pins 5 of the respective pin wheel units. Adjacent to the adjustable pin wheel unit, there is mounted a clamp collar 25 fixedly engageable with the rock sleeve 8 by means of a set screw 26 to hold the adjustable pin wheel unit in engaging relation with the end of the sectional platen cylinder 12 without, however, interfering with its rotation about the rock sleeve 8. The pin wheel units being interengaged with the sectional platen cylinder 12 by means of the studs 20 for unison rotation, and one of the pin wheel units being fixedly secured upon the main shaft 1 for unison rotation therewith, the assembly is subject to rotary motion about the stationary held rock sleeve 8 by the usual line spacing mechanism of the writing machine. As the platen cylinder and the interengaged pin wheel units rotate about the rock sleeve 8 and the pin actuating cams 23 mounted thereon the feeding pins are caused to travel through eccentric circuitous paths whereby, in unison with their motion about the axis of rotation, they are given simultaneously a reciprocatory motion during part of such travel by which they are projected beyond the periphery of the platen cylinder as they approach the high side of the eccentric cams 23. As they pass beyond such high side of the eccentric cams the pins are automatically retracted, thereby stripping or disengaging them from the marginally punched writing material with which they engage in their extended positions, not only freeing the paper without strain or mutilation, but also enabling the pins to clear contiguous portions of the writing machine with which they would interfere in their extended relation. By rocking the sleeve 8 and with it the pin control cams 23, such pins may be caused to project beyond the periphery of the platen roll at different positions. This enables the feeding pins 5 to be projected in position to operatively engage with the marginally punched writing material to progressively feed such material positively as the platen roll revolves, or such pins may be caused to project beyond the periphery of the platen cylinder in an ineffective or inoperative position wherein they do not engage with the writing material, and in such instance the usual pressure rollers 27, ordinarily found in writing and computing machines for cooperation with the usual frictional type of platen roll, may be utilized with the present platen roll for frictionally feeding writing material in the ordinary manner. Thus by the to and fro rocking adjustment of the sleeve 8 and with it the pin control cams 23, the present platen roll may be readily and quickly adapted for either positively feeding the writing material by progressive engagement therewith of the feeding pins 5 or such writing material may be frictionally fed by the cooperation of the usual pressure rollers 27 with the surface of the sectional platen cylinder 12, in which case the feeding pins 5 are adjusted to ineffective position.

For the purpose of adjusting the rock sleeve 8 and cams 23 and holding them in one or the other of their adjusted positions, the rock sleeve 8 is provided, beyond the extremity of the platen roll structure, with a peripherally notched disc 28 secured thereto which may be grasped to turn the sleeve 8 from one position to the other and within one or the other of the peripheral notches of which there engages a detent 29 which, in this instance, is illustrated as a spring pressed plunger carried upon a laterally projecting ear 30, projecting from a disc 31, fixedly secured by a set screw 32 to a second stationary disc 33 having a bifurcated arm 34 straddling a convenient frame rod 36 of the writing machine. By disengaging the spring pressed detent plunger from the notch of the disc 28, the latter may be rotated to adjust the cams 23 from effective to ineffective position and vice versa, in either of which positions they are held by the reengagement of the detent plunger 29 with the disc 28.

While the pins 5 are thus adjusted into and out of effective position, the pressure rollers 27 are likewise alternately adjustable into and out of operative relation with the platen cylinder by means of the usual finger lever 36 mounted upon the platen carriage of the writing machine and connected with the pressure roller mountings by a link 37. This construction is typical of writing machines now in use. It, however, enables the pressure rollers to be employed alternately with the radially projecting feeding pins 5 for feeding the writing material either positively by means of the pins or frictionally by cooperation of the pressure rollers.

While the use of sectional platen cylinders of different lengths to be interchangeably positioned between the relatively adjustable pin wheel units is the preferred construction, there is shown in Figs. 8 to 13 a modified construction employing a solid platen roll 40 having at one end thereof a pin wheel unit 41 embodying the features heretofore described, and adapted to engage the marginally punched holes in one margin of the writing material. Mounted in parallel relation with the platen roll 40 is a countershaft 42, carrying at one end a gear wheel 43 intermeshing with an idler pinion 44, which in turn intermeshes with a gear wheel 45 connected to and rotating with the platen roll 40. By this means the counter-shaft 42 is rotated in unison with the platen roll. Mounted upon the counter-shaft 42 is a second pin wheel unit 46 which is slidingly adjustable upon the counter-shaft 42 into registry with the marginally punched holes of writing material of various widths, the feeding holes in the opposite margin of which register with and are engaged by the feeding pins of the pin wheel unit 41. The adjustable pin wheel unit 46 is splined upon the counter-shaft 42 for unison rotation, but for independent axial adjustment thereon. It is held in various positions of axial adjustment to agree with the width of the writing material to be fed by means of a collar 47 sliding upon the shaft 42 and having a set screw 48 or other suitable detent means for securing it in its adjusted position. A slotted paper guide 49 is carried by the collar 47 and overhangs the marginally punched material engaged by the feeding pins which project through the holes in the material and thence through the slots in the paper guide 49. The feeding pins of the pin wheel unit 41 are controlled by a rock cam 23 secured upon a rock sleeve similar to the sleeve 8, carrying at its end beyond the end of the platen roll a notched disc 28 with which engages a detent 29 in the manner before described.

By rocking the cam to ineffective position, the position of projection of the feeding pins 5 is changed out of paper engaging position into an ineffective position thereby enabling the material to be frictionally fed by cooperation of the pressure rollers in the manner before described. In such event the adjustable pin wheel unit 46 may be slidingly adjusted upon the counter-shaft 42 to a position beyond the margin of the paper being fed and hence ineffective.

In Figs. 12 and 13 there is shown a further modification wherein the counter-shaft 42 is provided with a telescopic tubular extension 50 axially adjustable relative to the counter-shaft 42 which rotates within such tubular extension 50. Mounted upon the tubular extension 50 within the pin wheel unit 46 is a pin control cam 23 similar to that heretofore described, which, by the rocking adjustment of the tubular extension 50, is turned from effective to ineffective position and vice versa, to change the position of projection of the pins 5 of such adjustable pin wheel unit 46. The pin wheel unit 46 is connected to and rotates with the counter-shaft 42 and about the telescopic tubular extension 50 and control cam 23 carried thereby within the unit. The tubular extension 50 is axially adjustable with the pin wheel unit 46 to accommodate writing material of different widths. Splined upon the extension 50 is a gear wheel 51 intermeshing with a gear pinion 52 upon a supporting bracket 53, which in turn intermeshes with a gear wheel 54 mounted upon the sleeve 8 of the platen roll 40 which controls the position of projection of the feeding pins 5 of the pin wheel unit 41. This rock sleeve 8 is adjustable to alternative positions by means of the pin shifter disc 28 secured thereto and held in its adjusted position by the detent plunger 29. Any rocking motion of the sleeve 8 to adjust the feed pins 5 of the pin wheel unit 41 is transmitted through the several gears 54, 52 and 51 to the telescopic tubular extension 50 which is correspondingly rocked to adjust the pin control cam 23 within the pin wheel unit 46 and thereby change the position of projection of such pins from effective to ineffective position and vice versa in unison with such adjustment of the feeding pins 5 of the pin wheel unit 41. In this embodiment of the invention, although the respective pin wheel units are not concentrically mounted, they are nevertheless adjustable axially into differently spaced relation to accommodate writing material of different widths and likewise the feeding pins of the respective pin wheels are simultaneously controlled by the adjustment of the pin shifter disc 28 to change their positions of projection from effective to ineffective relation with the writing material and vice versa, thus enabling the material to be frictionally fed by the coaction of the pressure rollers when the pins are ineffective.

In lieu of the interconnection of the platen roll section and pin wheel units by means of the locating and driving pin 20 and the interengaging conical clutch faces 9 and 10, the ends of the platen roll section may be provided with split collars 55 having therein a series of notches 56, preferably irregularly spaced, within which are engageable similarly spaced lugs 57 on shoulders 58 formed on the pin wheel units as is illustrated in Figs. 14 and 15. The irregular spacing of the notches and lugs insures the interengagement of the platen roll sections with the pin wheel units in predetermined relation, preferably such that the split between the sections may be disposed intermediate succeeding feeding pin positions. The same positioning effect may be achieved by making different notches and corresponding lugs of larger or smaller sizes so that they may be interengaged only when properly positioned in predetermined relation. Such variation, differing from Figs. 14 and 15 by slight variation of size of different notches and lugs which would not appear materially different from the present showing, has not been specifically illustrated.

In the modification disclosed in Fig. 16 a removably mounted platen 60, carried by pins 62 in the pin wheel 64, is clamped intermediate a pair of pin wheels 64 which are held in adjusted position by screw 66 threadedly engaging journal 68 rotatably mounted in bearings 70 forming a part of the carriage 72. The journal 68, shown to the right of Fig. 16, has attached thereto a line spacing ratchet wheel 74 as is well known to those skilled in the art. A tubular sleeve 76 carries a cam 78 that may be rotated relative to the writing position of the machine so as to shift the pin wheel feeding device from operative to inoperative position or vice versa. This tubular sleeve also carries a disc 80 carrying the pins 82 registering with the holes 84 in the spool 86 rotatably mounted in the center of platen 60 so that as the pawl 88, shown to the right of Fig. 16, is moved forward or backward both pin wheel mechanisms are moved from one position to the other in unison.

When it is found expedient to interchange a platen of one length to a platen of another length so as to accommodate various widths of manifolding material the screws 66 are loosened and screws 67 are tightened so as to prevent the journal 68 from rotating when the screw threaded supporting rods 90 are unscrewed so as to separate the pin wheels 64, permitting the platen 60 to be removed and another platen inserted. When the other platen has been inserted, the screws 66 are tightened and the screws 67 loosened so as to permit the free rotation of the journal 68 with the platen. In operation the platen may be rotated by actuating the usual knobs 92 suitably attached to the ends of the screw threaded rods 90. These rods 90 are free to rotate independently of the cams 78 so that the shifting of the cams 78 from operative to inoperative position or vice versa does not influence the adjustment and relative spacing of the pin wheels and the platen supported thereby. Cross reference is made to copending application of J. Q. Sherman, Serial Number 52,169, filed November 29, 1935 and Serial Number 68,219, filed March 11, 1936, which disclose further developments and amplifications of the present invention.

Cross reference is made to copending application Serial No. 106,586, filed October 15, 1936, which is a division hereof directed to the construction comprising the offset pin type feeding device shown herein.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute, the invention has been described in language more or less specific as to structural features, it is to be understood that the invention is not limited to the specific features shown, but that the means and construction herein disclosed comprise the preferred form of several modes of putting the invention into effect, and the invention is therefore claimed in any of its forms or modifications within the legitimate and valid scope of the appended claims.

Having thus described our invention, we claim:

1. A platen roll for a writing machine including a pair of relatively adjustable concentric heads, a shaft on which the heads are mounted for relative adjustment toward and from each other, and a longitudinally split platen roll section positioned between the heads and interchangeable with other platen roll sections of different lengths engageable between the heads in different positions of relative adjustment thereof to accommodate record material of different widths.

2. A platen roll for a writing machine including a pair of relatively adjustable concentric pin wheel units for progressive engagement with series punched holes in record material to be fed, and a platen roll section interchangeable with other platen roll sections of different lengths engageable between the units in different positions of relative adjustment thereof to accommodate series punched record material of different widths.

3. A platen roll for writing machines including a pair of relatively adjustable concentric heads, and a longitudinally split platen roll therebetween, the heads being adaptable, by their relative adjustment, to enable platen roll sections of different lengths to be interchangeably assembled therebetween in different positions of relative adjustment of the heads to accommodate record material of different widths.

4. A platen roll for a writing machine including a pair of relatively adjustable concentric pin wheel units, and a longitudinally split platen engaged therebetween, the pin wheel units being engageable with platen roll sections of different lengths to be interchangeably assembled intermediate the pin wheel units in different positions of relative adjustment thereof to accommodate series punched record material of different widths.

5. A platen roll for writing machines including a pair of axially adjustable pin wheel units and a detachable platen roll section interposed between and interengaged with the respective pin wheel units for unison rotation, said platen roll section being interchangeable with other such sections of different lengths, accommodated by relative adjustment of the pin wheel units.

6. The combination with a removable platen roll for a writing machine of a pair of relatively adjustable pin wheel units having disappearing pins engageable in series punched holes in record material fed about the platen roll and by their relative adjustment adaptable to series punched record material of different widths, between which the platen roll is located.

7. The combination with a platen roll for a writing machine of a pair of pin wheel units having disappearing pins simultaneously engageable with series punched record material fed about the platen roll, at least one of said pin wheel units being concentric with the platen roll, and at least one of the units being axially adjustable to accommodate series punched paper of different widths.

8. The combination with a platen roll for a writing machine of a pair of relatively adjustable pin wheel units having disappearing pins, at least one of the units being axially adjustable, and synchronizing means between the respective pin wheel units operative in all positions of relative adjustment of the pin wheel units for equalizing the operation thereof.

9. In a paper feeding means for a writing machine a pair of pin wheel units progressively engageable in series punched holes in record material to be fed, said pin wheel units being axially adjustable relative to each other, and a series of interchangeable platen roll sections of different lengths engageable between the pin wheel units to accommodate record material of different widths.

10. In a paper feeding means for writing machines a pair of axially adjustable pin wheel units engageable progressively with series punched holes in record material to be fed, and platen roll sections engageable between the pin wheel units in each of several positions of adjustment to accommodate record material of different widths.

11. As an article of manufacture a platen assembly including a pair of axially adjustable pin wheel units having disappearing pins engageable progressively with series punched holes in record material to be fed, said pin wheel units being provided with seats and a platen roll section selected from a plurality of platen roll sections of different widths, said platen roll section being seated in said seats and mounted intermediate the pin wheel units to accommodate record material of a width commensurate with the selected platen roll section.

12. As an article of manufacture for use in a writing machine having a pair of spaced pin wheel feeding heads, a longitudinally split platen roll for the writing machine comprising two trough like semicylindrical sections engaged by said pair of spaced heads by which the sections are held in a uniform cylindrical body.

13. In a writing machine, the combination of a pair of relatively adjustable pin feeding units, at least one of which is adjustable and a segmental platen associated with said pin feeding units, said segments being interchangeable to accommodate various adjustments of the feeding devices.

14. In a writing machine, the combination of adjustable pin feeding devices having disappearing pins engaging in series punched holes in record material with a platen roll about which the record material is fed, said platen roll including segments removably mounted.

15. In a writing machine, the combination of a pair of relatively adjustable pin wheel units having disappearing pins engageable in series punched holes in record material with a platen about which the record material is fed, said platen including a plurality of segments removably mounted.

16. The combination of a pair of relatively adjustable pin wheel units each having disappearing pins, at least one of said units is adjustable axially with a platen including a plurality of segments removably mounted and means for actuating the pin wheel feeding device and the platen in unison.

17. In a writing machine, the combination of pin feeding devices having disappearing pins simultaneously engaging with series punched record material with a platen including a plurality of segments removably mounted and means for rotating the platen and the pin feeding mechanism in unison.

18. In a writing machine, the combination with a platen including a group of removably mounted sections selected from a plurality of interchangeable groups of sections of relatively spaced pin type feeding devices, for simultaneous engagement with series punched record material, said pin feeding devices being adjustably mounted concentrically with the group of platen sections, and axially movable into and out of terminal engagement therewith, to accommodate selected groups of platen sections of different lengths.

19. In a writing machine, the combination of pin feeding devices simultaneously engaging with series punched record material with a platen including one group of removably mounted sections selected from a plurality of groups of interchangeable sections, said pin feeding devices being adjustably mounted concentrically with the selected group of platen sections for axial movement into and out of engagement with the ends thereof to accommodate selected groups of platen sections of different lengths, and means for actuating the platen and feeding devices in unison.

20. In a writing machine, a pair of pin wheel units engageable with record material for progressively advancing the material past a writing position, and a cylindrical platen roll removably interposed between the pin wheel units, including longitudinally separable sections having their lines of division at opposite sides of the roll relatively offset out of a common diametrical plane.

21. In a writing machine, a pair of pin wheel units engageable with record material for progressively advancing the material past a writing position, and a cylindrical platen roll removably interposed between the pin wheel units, including longitudinally separable sections of unequal peripheral extent.

22. In a writing machine, a pair of pin wheel units engageable with record material for progressively advancing the material past a writing position, and a cylindrical platen roll removably interposed between the pin wheel units, said platen roll being one of a plurality of platen roll members of different length to be interchangeably positioned between the pin wheel units, at least one of said pin wheel units being axially adjustable to accommodate platen roll members of different sizes.

23. In combination with a writing machine, of a platen roll, a pair of relatively adjustable concentric heads, the platen roll being longitudinally split for adjustment between said heads, the heads being adaptable by their relative adjustment to platen roll sections of different lengths to be interchangeably assembled intermediate the heads in different positions of relative adjustment thereof to accommodate record material of different widths, said split lines of separation in said platen roll being positioned intermediate writing line positions in the typewriter.

24. The combination with an easily removable split platen roll for a writing machine, of a pair of axially adjustable pin wheel units with which the split platen portions are terminally engageable to hold the platen portions in adjusted position having the pins thereof engageable in series punched holes in record material fed circumferentially about the platen roll and by their relative adjustment adaptable in combination with interchangeable platen portions of different lengths to series punched record material of different widths, and means for holding the record material loosely on the feed pins.

25. The combination with an interchangeable demountable platen roll for a writing machine, of a pair of axially adjustable pin wheel units engageable in series punched holes in record material fed circumferentially about the platen roll with which the opposite ends of the platen roll are detachably engageable for quick demounting, and corresponding conformations on the platen roll and pin wheel units interengaged and disengaged by relative axial shifting movement from the pin wheel units.

26. The combination with an interchangeable removable platen roll for a writing machine, of a pair of relatively adjustable aligning pin wheel feeding devices concentrically mounted with respect to said platen roll which is removable without removing the feeding devices and means for operatively connecting the said platen roll to the aligning and feeding device for synchronous operation.

27. As an article of manufacture a longitudinally split platen roll for a writing machine, a pair of pin wheel units located one at each end of the platen roll, and locating means determining the relative rotative adjustment of the platen roll and pin wheel units to locate the joints of the split platen intermediate adjacent writing positions.

28. In a platen for a writing machine, a cylindrical roll comprising multiple longitudinally separable segmental sections, interchangeable with a group of similar sections of different length and a support therefor common to said groups of sections of different length constructed and arranged to releasably hold either of the respective groups of sections in assembled cylindrical relation.

29. In a platen for a writing machine, a cylindrical roll comprising a plurality of longitudinally separable segmental sections and a support therefor with which the sections are detachably engageable constructed and arranged to hold the sections in assembled cylindrical relation.

30. In a platen for a writing machine, a cylindrical roll including a plurality of longitudinally separable segmental sections of like length but different arcuate extent and a common support therefor with which the sections are detachably engageable constructed and arranged to hold the sections in assembled cylindrical relation.

31. In a platen for a writing machine, a cylindrical roll including multiple longitudinally separable segmental sections and a pair of spaced mounting heads with which the sections are detachably engageable, constructed and arranged to releasably hold the sections in assembled cylindrical relation.

32. In a platen for a writing machine, a cylindrical roll including multiple longitudinally separable segmental sections and interchangeable with a group of similar segmental sections of different length, and a pair of spaced mounting heads at least one of which is axially adjustable relative to the other to accommodate said mounting heads to roll sections of different length with which the sections of different length are detachably engageable, the mounting heads being constructed and arranged to releasably hold the engaged sections in assembled cylindrical relation.

33. A platen roll for an imprinting machine including a mounting shaft, a cylindrical body which is one of a plurality of interchangeable cylindrical bodies of different lengths, and a pair of relatively spaced heads, one of which is adjustable relative to the other, carried by the shaft and common to the plurality of cylindrical bodies of different length, and matching surfaces upon the cylindrical body and the heads engageable and disengageable upon relative axial adjustment of the heads.

34. A platen roll for imprinting machines or the like, including a mounting shaft, a pair of mounting heads axially adjustable one relative to the other upon the shaft, a cylindrical platen body interengaged therewith comprising one of a plurality of different interchangeable bodies interposed between the heads, a groove in the adjacent face of one of said interengaging members and a corresponding rib on the face of the other interengaging member engageable in said groove upon the approach of the heads one toward the other, and means for locking the heads in their relative adjusted relation to retain the interposed cylindrical body in interengaged relation therewith.

35. In a platen roll for writing machines, a plurality of separable segments of a cylinder, arranged in grouped relation to afford a cylindrical unit, a pair of mounting heads axially adjustable one relative to the other between which the assembly of segments is interposed, and a concentric tongue and groove connection between the respective segments and the respective mounting heads for retaining the segments in assembled relation.

36. A platen roll for a writing machine including independent spaced detachable mounting heads common to a plurality of interchangeable platen rolls, and which platen roll comprises one of a plurality of interchangeable platen rolls alternately engageable intermediate the mounting heads on the writing machine, including a plurality of independent separable segments of a cylinder, the segments having in their opposite ends concentric registering grooves combining to form a continuous annular groove when assembled for intercoupling engagement with the detachable mounting heads.

37. A platen roll for a writing machine, including one of a plurality of interchangeable rolls alternately engageable with a mount common to the plurality thereof, comprising a plurality of separable segments of a cylinder arranged in grouped relation to afford a cylindrical unit, and maching protuberances and sockets on the segments and mount having interlocking interengagement one in the other when the segments are assembled in operative condition.

38. A platen roll for a writing machine, comprising a plurality of longitudinally separable segmental sections, a common mount therefor with which the segments are detachably engageable, and means for detachably intercoupling the segments and mount with each other for unison rotation when the platen roll is assembled.

39. A platen roll for a writing machine, comprising a plurality of longitudinally separable segmental sections, a mount therefor common to the plurality of segments, and coupling means interengaging the mount and segments for positive driving action when the platen roll is assembled.

40. A platen roll for a writing machine, comprising a plurality of longitudinally separable segmental sections, a mount therefor common to the plurality of segmental sections, and interengaging portions upon the mount and segmental sections respectively having operative engagement with each other when the platen roll is assembled.

JOHN Q. SHERMAN.
ALBERT W. METZNER.